US011783570B2

(12) United States Patent
Shen (10) Patent No.: US 11,783,570 B2
(45) Date of Patent: Oct. 10, 2023

(54) METHOD AND APPARATUS FOR DETERMINING ROAD INFORMATION DATA AND COMPUTER STORAGE MEDIUM

(71) Applicant: BEIJING BAIDU NETCOM SCIENCE AND TECHNOLOGY CO., LTD., Beijing (CN)

(72) Inventor: Dayun Shen, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 268 days.

(21) Appl. No.: 17/215,563

(22) Filed: Mar. 29, 2021

(65) Prior Publication Data

US 2021/0213971 A1 Jul. 15, 2021

(30) Foreign Application Priority Data

Aug. 25, 2020 (CN) .......................... 202010862248.4

(51) Int. Cl.
*B60W 60/00* (2020.01)
*G06V 10/774* (2022.01)
(Continued)

(52) U.S. Cl.
CPC ......... *G06V 10/774* (2022.01); *B60W 60/001* (2020.02); *G06V 20/05* (2022.01);
(Continued)

(58) Field of Classification Search
CPC ......... B60W 60/001; B60W 2420/403; B60W 2252/53; G06V 20/58; G01S 19/43; G01C 21/20; G01C 21/3841
See application file for complete search history.

(56) References Cited

U.S. PATENT DOCUMENTS

2018/0164812 A1 6/2018 Oh et al.
2018/0300564 A1* 10/2018 Kwant .................. G06V 10/50
(Continued)

FOREIGN PATENT DOCUMENTS

CN 101196407 A 6/2008
CN 103971589 A 8/2014
(Continued)

OTHER PUBLICATIONS

European Patent Application No. 21165627.7 extended European search report dated Sep. 20, 2021, 10 pages.
(Continued)

*Primary Examiner* — Kenneth J Malkowski
(74) *Attorney, Agent, or Firm* — Cozen O'Connor (57) ABSTRACT

Exemplary embodiments of the present disclosure provide a method and apparatus for determining road information data and a computer storage medium, which may be used for autonomous driving, road information prediction, and driving route planning. The method for determining road information data includes: determining, via a precision navigation device of a vehicle, a plurality of locations of the vehicle; acquiring, via a sensor of the vehicle, a plurality of image frames of a physical environment where the vehicle is located; determining, from the plurality of locations, a target location corresponding to at least one image frame among the plurality of image frames; and determining, based on the determined target location and a map related to the physical environment, road information data corresponding to the at least one image frame. According to the solution of the present disclosure, road information annotation data may be accurately and efficiently generated.

17 Claims, 6 Drawing Sheets

(51) Int. Cl.
  *G06V 20/58*  (2022.01)
  *G06V 20/56*  (2022.01)
  *G06V 20/05*  (2022.01)
(52) U.S. Cl.
  CPC ............ *G06V 20/58* (2022.01); *G06V 20/588* (2022.01); *B60W 2420/403* (2013.01); *B60W 2552/53* (2020.02)

(56) References Cited

U.S. PATENT DOCUMENTS

| | | | | |
|---|---|---|---|---|
| 2019/0206123 | A1* | 7/2019 | Zhou | G06T 17/05 |
| 2020/0132477 | A1 | 4/2020 | Averilla | |
| 2020/0202147 | A1* | 6/2020 | Berkemeier | G06N 20/00 |
| 2020/0217667 | A1* | 7/2020 | Kim | G06T 3/0031 |

FOREIGN PATENT DOCUMENTS

| | | | |
|---|---|---|---|
| CN | 207460317 | U | 6/2018 |
| CN | 109798903 | A | 5/2019 |
| CN | 110047373 | A | 7/2019 |
| CN | 110135323 | A | 8/2019 |
| CN | 110376604 | A | 10/2019 |
| JP | 2007-249103 | A | 9/2007 |
| JP | 2010-237797 | A | 10/2010 |
| JP | 2013-206312 | A | 10/2013 |
| JP | 2018-152053 | A | 9/2018 |
| JP | 2019-145089 | A | 8/2019 |
| WO | WO 2020045318 | A1 | 3/2020 |
| WO | WO 2020/137312 | A1 | 7/2020 |

OTHER PUBLICATIONS

Behrendt Karsten et al: "Unsupervised Labeled Lane Markers Using Maps", 2019 IEEE/CVF International Conference On Computer Vision Workshop (ICCVW), pp. 832-839.

Rigatos et al., "Extended Kalman and Particle Filtering for sensor fusion in motion control of mobile robots", Mathematics and Computers in Simulation, Elsevier, vol. 81, dated Nov. 1, 2010, pp. 590-607.

Youjun, Tao, "Simulation and Optimization of Mineral Processing", Jan. 2018, 3 pages.

* cited by examiner

METHOD AND APPARATUS FOR DETERMINING ROAD INFORMATION DATA AND COMPUTER STORAGE MEDIUM

CROSS-REFERENCE TO RELATED APPLICATIONS

This application claims priority to Chinese Patent Application No. 202010862248.4, filed with the China National Intellectual Property Administration (CNIPA) on Aug. 25, 2020, the contents of which are incorporated herein by reference in their entirety.

TECHNICAL FIELD

Embodiments of the present disclosure relate to the field of autonomous driving, and more specifically, to a method and apparatus for determining road information data and a computer storage medium.

BACKGROUND

With the development of computers and the Internet, in autonomous driving scenarios, more and more neural network structures have been proposed to predict various lane lines, roadsides, road arrows, and speed limit signs in roads. The input of these neural network models is image information acquired by cameras on vehicles, and the semantic information such as lane lines, road arrows, and speed limit signs in the images is manually annotated as truth values for continuous training, so that the neural network models may accurately predict various lane lines, roadsides, road arrows, and speed limit signs in the roads. However, a large amount of annotation data is required to train the neural network models.

SUMMARY

Embodiments of the present disclosure provide a method for determining road information data.

In a first aspect, embodiments of the present disclosure provide a method for determining road information data, comprising: determining, via a precision navigation device of a vehicle, a plurality of locations of the vehicle; acquiring, via a sensor of the vehicle, a plurality of image frames of a physical environment where the vehicle is located; determining, from the plurality of locations, a target location corresponding to at least one image frame among the plurality of image frames; and determining, based on the determined target location and a map related to the physical environment, road information data corresponding to the at least one image frame.

In a second aspect, embodiments of the present disclosure provide an apparatus for determining road information data, comprising: a first location acquisition module, configured to determine, via a precision navigation device of a vehicle, a plurality of locations of the vehicle; an image acquisition module, configured to acquire, via a sensor of the vehicle, a plurality of image frames of a physical environment where the vehicle is located; a location determination module, configured to determine, from the plurality of locations, a target location corresponding to at least one image frame among the plurality of image frames; and a first road information data determination module, configured to determine, based on the determined target location and a map related to the physical environment, road information data corresponding to the at least one image frame.

In a third aspect, embodiments of the present disclosure provide an electronic device, comprising: one or more processors; and a Memory, storing one or more programs, wherein the one or more programs, when executed by the one or more processors, cause the one or more processors to implement the method for determining road information data provided by the first aspect.

In a forth aspect, embodiments of the present disclosure provide a computer-readable medium, storing a computer program thereon, wherein the program, when executed by a processor, causes the processor to implement the method for determining road information data provided by the first aspect.

It should be understood that the content described in this section is neither intended to identify key or important features of the embodiments of the present disclosure, nor intended to limit the scope of the present disclosure. Other features of the present disclosure will become understandable through the following description.

BRIEF DESCRIPTION OF THE DRAWINGS

The above and other features, advantages and aspects of various embodiments of the present disclosure will become more apparent with reference to the accompanying drawings and detailed descriptions below. The same or similar reference signs in the drawings denote the same or similar elements, in which.

DETAILED DESCRIPTION OF EMBODIMENTS

Hereinafter, embodiments of the present disclosure will be described in more detail with reference to the accompanying drawings. Although the drawings show the embodiments of the present disclosure, it should be understood that the present disclosure may be implemented in various forms and should not be limited by the embodiments set forth herein. On the contrary, these embodiments are provided so that the present disclosure will be more thorough and complete, and may fully convey the scope of the present disclosure to those skilled in the art.

The term "include/comprise" and its variants as used herein represent open-ended inclusion, that is, "include/comprise but not limited to". Unless specifically stated otherwise, the term "or" represents "and/or". The term "based on" represents "based at least in part on". The terms "one exemplary embodiment" and "one embodiment" represent "at least one exemplary embodiment". The term "another embodiment" represents "at least one additional embodiment". The terms "first", "second" and the like may indicate different or identical objects. Other explicit and implicit definitions may also be included below.

In the description of the embodiments of the present disclosure, the term "model" may learn the correlation between the corresponding input and output from training data, so that after the training is completed, the given input is processed based on a parameter set obtained by the training to generate the corresponding output. "Model" may sometimes be called "neural network", "learning model", "learning network" or "network". These terms are used interchangeably herein.

As mentioned above, the semantic information such as lane lines, road arrows, and speed limit signs in the images needs to be manually annotated. However, the manual annotation has the following shortcomings: (1) the annotation with mass annotation data for training the neural network model leads to high cost; (2) the annotation staffs are at different levels, so the annotation quality may not be guaranteed, and there are often mistakes and omissions; and (3) the manual annotation of mass data requires a long work cycle. Therefore, a low-cost, accurate, fast and efficient road information data annotation method is required.

According to an embodiment of the present disclosure, a solution for determining road information data is proposed. This solution uses locations and a map to acquire road information data as annotation data. In this solution, a plurality of locations of a vehicle is determined by a precision navigation device of the vehicle, and a plurality of image frames of a physical environment where the vehicle is located are acquired by a sensor of the vehicle. A target location corresponding to at least one image frame of the plurality of image frames is determined from the plurality of locations. Road information data corresponding to the image frame may be determined according to the target location and the map.

By establishing the relationship between the locations of the vehicle and the images taken by the vehicle, the relationship between the road information data in the high-precision map and the images may be further established, and the road information data may be used as annotation data to train a neural network model. Therefore, road information data annotations may be accurately, quickly and efficiently generated at low cost, which lays the foundation for accurate training of the neural network model.

The basic principle and several exemplary implementations of the present disclosure are explained below with reference to the accompanying drawings.

Figure 1:
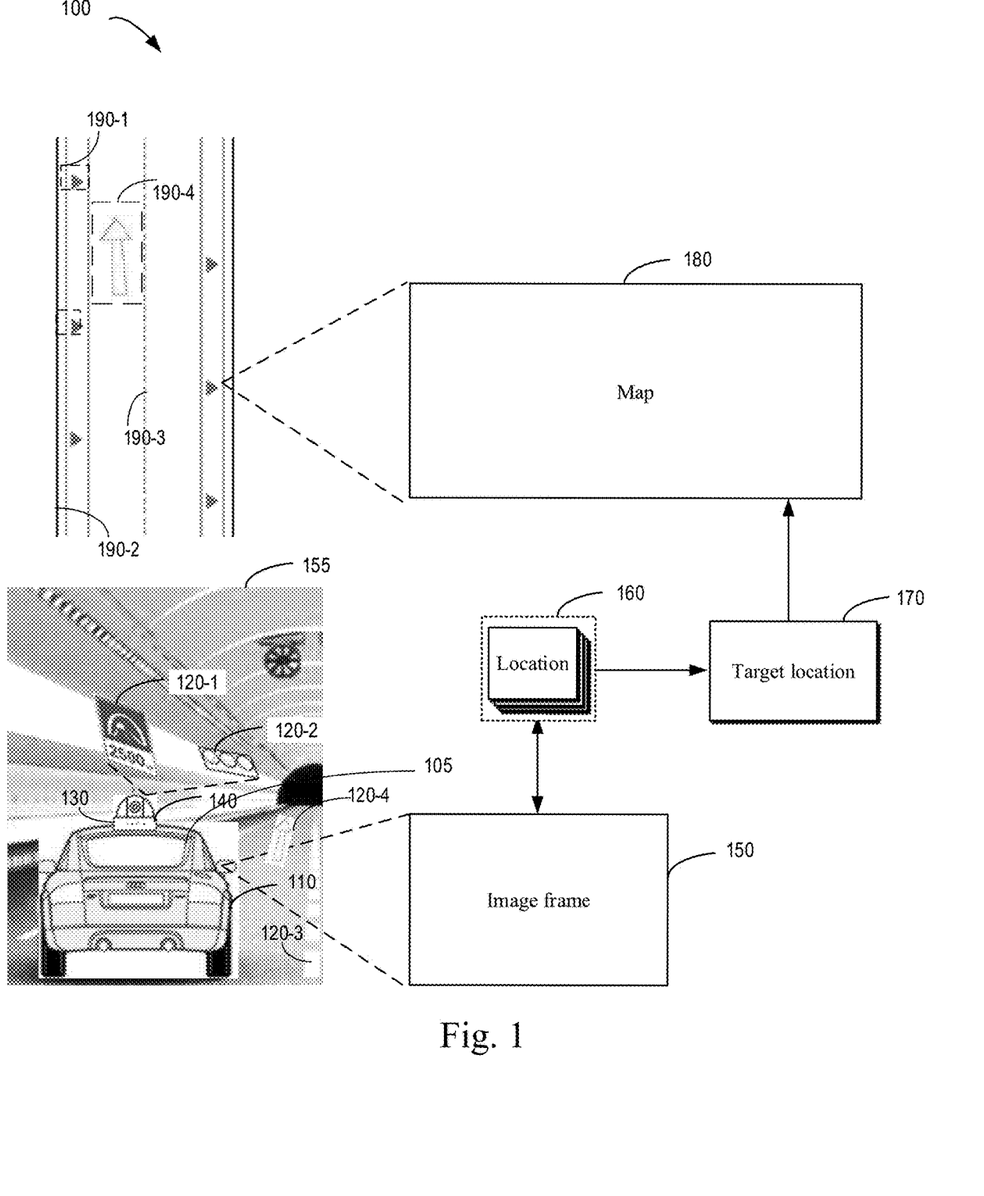
FIG. 1 shows a schematic diagram of an exemplary environment in which multiple embodiments of the present disclosure may be implemented.

FIG. 1 shows a schematic diagram of an exemplary environment 100 in which multiple embodiments of the present disclosure may be implemented. It should be understood that the environment 100 shown in FIG. 1 is only exemplary, and should not constitute any limitation on the functions and scope of the implementation described in the present disclosure. As shown in FIG. 1, the environment 100 includes a vehicle 110 driven on a road. In the example of FIG. 1, the vehicle 110 may be any type of vehicle that may carry passengers and/or objects and is actuated by means of a power system such as an engine, including but not limited to cars, trucks, buses, electric vehicles, motorcycles, motor homes, trains, and the like. In some embodiments, one or more vehicles 110 in the environment 100 may be vehicles with certain autonomous driving capabilities, and such vehicles are also referred to as unmanned vehicles. In some embodiments, the vehicle 110 may also be a vehicle without autonomous driving capability.

The vehicle 110 may be communicatively coupled to a computing device 105. The computing device 105 may be embedded in the vehicle 110. The computing device 105 may also be an entity external to the vehicle 110, and may communicate with the vehicle 110 via a wireless network. The computing device 105 may be any device with computing capability. As a non-limiting example, the computing device 105 may be any type of stationary computing device, mobile computing device, or portable computing device, including but not limited to a desktop computer, a laptop computer, a notebook computer, a netbook computer, a tablet computer, a multimedia computer, a mobile phone, and the like; and all or part of the components of the computing device 105 may be distributed in a cloud. The computing device 105 at least includes a processor, a memory, and other components usually present in a general-purpose computer, so as to implement functions such as computation, storage, communication, and control.

The vehicle 110 includes a precision navigation device 130, and the precision navigation device 130 may determine the location of the vehicle 110 by means of various locating signals, such as a global navigation satellite system (GNSS) alone, or a combination of locating signals of GNSS and real-time kinematic (RTK) locating technology, or a combination of GNSS and an inertial navigation system (INS). In one example, the precision navigation device is a SPAN-CPT navigation device. Since the SPAN-CPT navigation device obtains centimeter-level location precision, the accuracy of the location of the vehicle 110 is improved.

Here, the term "location" refers to the longitude, latitude, pitch angle, heading angle, and rotation angle of the vehicle in a specific coordinate system. For example, in a two-dimensional coordinate system and a three-dimensional coordinate system, the location of the vehicle may be expressed by a heading angle. In the three-dimensional coordinate system, the attitude of the vehicle may also be expressed by a pitch angle, a heading angle and a rotation angle. However, it should be understood that this is for illustration purpose only and is not intended to limit the scope of the present disclosure.

The vehicle 110 further includes at least one sensor 140, which is configured to acquire an image 110 of a physical environment where the vehicle 110 is located. For example, in the example of FIG. 1, the sensor 140 may be an image sensor, which acquires a plurality of image frames of the physical environment 155 where the vehicle 110 is located through computer vision technology. In the exemplary environment 100 of FIG. 1, the image frame 150 is one image frame among the plurality of image frames. Although not shown, it should be understood that the plurality of image frames may further include other frames, and image processing according to the present disclosure may be performed on the other frames. The plurality of image frames may also be a plurality of image frames captured from a dynamic image taken by a camera. Just as an example, in a scenario such as L3 level autonomous driving, the plurality of image frames may be captured by one forward wide-angle camera and four fish-eye cameras. The plurality of image frames may also be acquired in any suitable manner. In some embodiments, the sensor 140 may be one or more wide-angle or ultra-wide-angle cameras, and these cameras may capture scenarios within 360 degrees of the surrounding environment. Alternatively, the sensor 140 may also have a rotatable structure so as to rotatably detect real-time scenarios in multiple directions outside the vehicle 110.

The map 180 may be a map related to the physical environment 155 where the vehicle 110 is located. The map

180 may be predetermined before the vehicle 110 passes through the physical environment 155, and may be provided to the computing device 105 of the vehicle 110.

In one example, the map 180 may be a high-precision map, and the high-precision map may include various road information data related to the physical environment 155, such as various lane line types 190-2 and 190-3 (single dashed lines, single solid lines, left virtual and right real double lines, left real and right virtual double lines, deceleration lane lines, roadsides, and guardrails) related to the lane line 120-3; and bounding boxes 190-1 and 190-4 of various features (road arrows, light poles, highway signs, speed limit signs, etc.) related to the road signs 120-1, 120-2, and 120-4. The lane lines in the high-precision map are formed by collecting a point every 4 m, for example, in WGS-84 (World Geodetic System 1984, a coordinate system established for the use of a global positioning system (GPS)), and then connecting the discrete points. Hereinafter, the lane line types 190-2 and 190-3 and the road signs 120-1, 120-2, and 120-4 that reflect the road information in the map 180 are collectively referred to as road information data.

In this exemplary environment 100, the computing device 105 acquires a plurality of locations 160 and a plurality of image frames by means of the precision navigation device 130 and the sensor 140 respectively, and then matches at least one image frame 150 in the image with a corresponding target location 170, so as to acquire corresponding road information data in the map 180 by using the target location 170.

Figure 2:
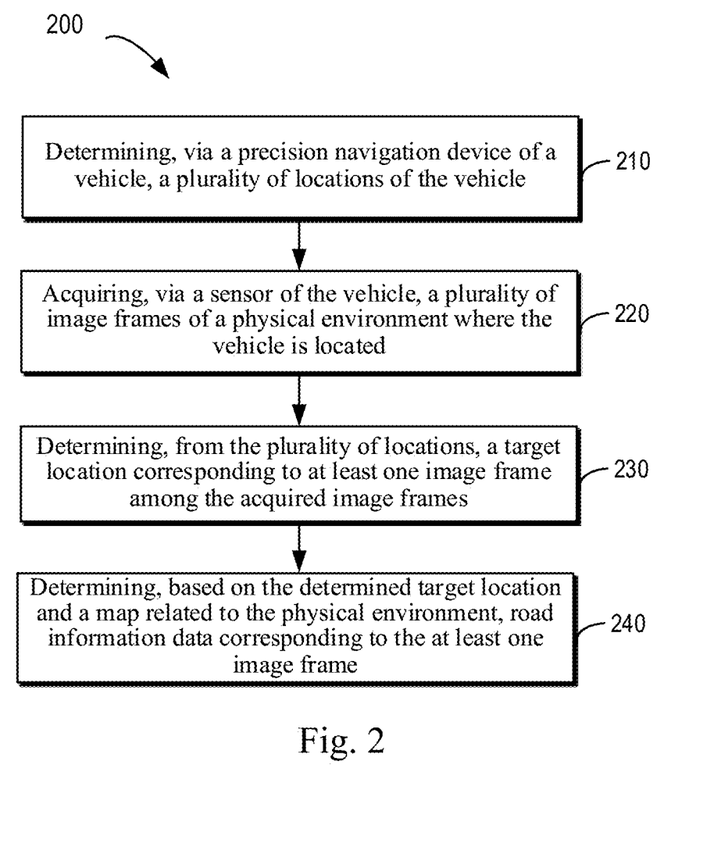
FIG. 2 shows a flowchart of a process of determining road information data according to some embodiments of the present disclosure.

The detailed process of determining road information data will be further described below with reference to FIGS. 2 to 4. FIG. 2 shows a flowchart of a method 200 for determining road information data according to an embodiment of the present disclosure. The method 200 may be implemented by the computing device 105 in FIG. 1. For ease of description, the method 200 will be described with reference to FIG. 1.

In block 210, the computing device 105 determines a plurality of locations 160 of the vehicle via the precision navigation device 130 of the vehicle 110. In some embodiments, when the vehicle 110 is driven to a certain location, a SPAN-CPT navigation device installed inside or outside the vehicle 110 may be used to acquire the longitude, latitude, pitch angle, heading angle, and rotation angle of the vehicle 110 in a global coordinate system.

In one example, the principle of locating the vehicle by the precision navigation device 130 is: the location of the vehicle is fused out based on a particle filtering or extended Kalman filtering algorithm, under the drive of IMU, and with the results of matching GPS, vehicle speed, high-precision map and camera perception data as observation. The specific method may be: acquiring a fusion algorithm, wherein the fusion algorithm includes a particle filtering algorithm and an extended Kalman filtering algorithm, the particle filtering algorithm has the functions of quickly initializing location results in multiple ways, matching the high-precision map with the perception data, and sending an initialized location of the vehicle to the extended Kalman filtering algorithm; and the Kalman filtering algorithm predicts a location of the vehicle in the next frame through the vehicle locating of the IMU, updates the location predicted by the IMU in multiple ways of observation to obtain an updated location of the vehicle, and outputs the updated location of the vehicle to obtain a final location of the vehicle.

In block 220, the computing device 105 acquires a plurality of image frames of the physical environment 155 where the vehicle 110 is located via the sensor 140 of the vehicle 110. In some embodiments, when the vehicle 110 is driven to a certain location, an image or video in front of the vehicle 110 may be captured by a camera installed inside or outside the vehicle 110, and then the image or video may be framed to obtain the plurality of image frames.

As shown in FIG. 1, one image frame 150 among the plurality of image frames may reflect the physical environment 155 in front of the vehicle 110, including a road information sign 120-1, signal lights 120-2, a lane line 120-3, and a road arrow 120-4. It should be understood that the number and types of objects included in the image frame 150 shown in FIG. 1 are only exemplary, and are not intended to be limited. The image frame 150 may include any number and type of objects.

In one example, the image frame 150 is used as input data of a neural network to predict perception data (for example, lane line data, sign data, signal light data, and the like) in an image coordinate system. However, since the data of the perception system comes from the processing of the image captured by the camera, the quality of the original image affects the quality of the final perception data. The perception data is affected by different scenarios such as weather, light, and road conditions. The detection quality is high in the case of good light conditions (sunny days), while the detection quality is low in rainy and snowy weather and at night. At present, in typical scenarios such as ramps and traffic jams, the perception is extremely prone to misdetection, for example, dotted lines are detected as solid lines, or solid lines are detected as dotted lines. For example, on a bituminous road, because the bitumen reflects light, the bitumen is easily detected as lane lines. Therefore, accurate road information data corresponding to the perception data is required as a true value to train the neural network.

In an alternative embodiment, the computing device 105 may communicate with one or more devices external to the vehicle 110 that are associated with the physical environment where the vehicle 110 is located to acquire the image 110. For example, the computing device 105 may communicate with a drive test camera around the location of the vehicle 110 to acquire the image 110. It should be understood that network technologies known in the art (for example, cellular networks (such as fifth-generation (5G) networks, long-term evolution (LTE) networks, third-generation (3G) networks, and code division multiple access (CDMA) networks), public land mobile network (PLMN), local area networks (LAN), wide area networks (WAN), metropolitan area networks (MAN), telephone networks (such as public switched telephone network (PSTN)), private networks, self-organizing networks, intranet, the Internet, optical fiber-based networks, and/or a combination of these or other types of networks) are used to establish the connections between the computing device 105, the vehicle 110 and the roadside camera, and details are not described herein again.

In block 230, the computing device 105 determines a target location 17 corresponding to at least one image frame 150 of the plurality of image frames from the plurality of locations 160. The computing device 105 determines the target location corresponding to the at least one image frame 150 from the plurality of locations 160 on time. This will be described in detail below in conjunction with FIG. 3.

Figure 3:
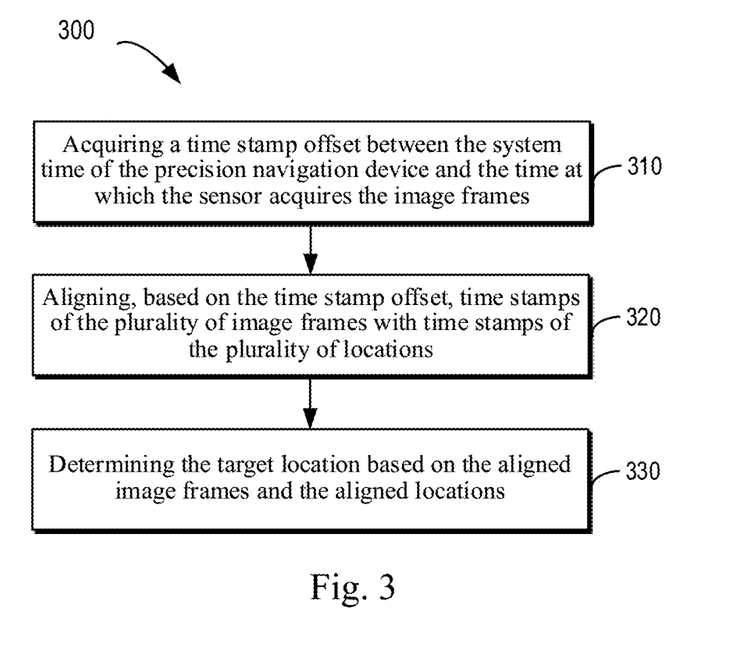
FIG. 3 shows a flowchart of a process of determining a target location according to some embodiments of the present disclosure.

FIG. 3 shows a flowchart of a process of determining a target location according to some embodiments of the present disclosure.

In block 310, the computing device 105 acquires a time stamp offset between the system time of the precision navigation device 130 and the time at which the sensor 140 acquires image frames. In one embodiment, the precision navigation device 130 on the vehicle locates the vehicle 110 at a predetermined frequency (for example, 100 Hz) to obtain a plurality of locations, and each location has a location time stamp. The camera on the vehicle 110 shoots the physical environment 155 in front of the vehicle 110 at a predetermined frequency to obtain a plurality of image frames, and each image frame also has an image frame time stamp. The location time stamp of the precision navigation device 130 system and the image frame time stamp of image exposure often have a difference, that is, the time stamp offset. The computing device 105 computes the difference according to the system time of the precision navigation device 130 and the time of image exposure as the time stamp offset.

In block 320, the computing device 105 aligns, based on the time stamp offset, time stamps of a plurality of image frames with time stamps of a plurality of locations. In one example, the computing device 105 adjusts the location time stamp or the image frame time stamp according to the difference to align them, for example, the difference is added to or subtracted from the time stamp of each location to align with the time stamp of image exposure.

In block 330, the computing device 105 determines a target location based on the plurality of image frames and the plurality of locations that are aligned. Since the precision navigation device 130 performs locating according to the predetermined frequency, for example, 100 Hz, and the sensor 140 acquires the image frames according to another predetermined frequency, for example, 33 Hz, the location data is dense and the image frame data is sparse. However, the sparse data may not directly correspond to the dense data. For example, an image frame is acquired at the time stamp 1.3 s, and there may not be a corresponding location at 1.3 s, so the target location corresponding to the image frame acquired at 1.3 s needs to be determined. The determination of the target location will be described in detail below in conjunction with FIG. 4. The frequencies are only exemplary, and the present disclosure does not limit the frequencies at which the precision navigation device and the sensor acquire images.

Figure 4:
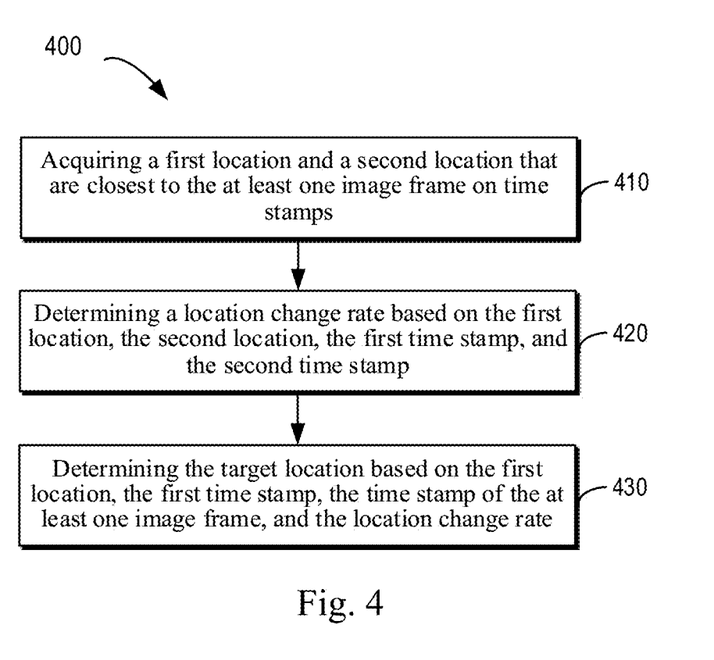
FIG. 4 shows a flowchart of a process of determining a target location according to some embodiments of the present disclosure.

FIG. 4 shows a flowchart of a process of determining a target location according to some embodiments of the present disclosure.

In block 410, the computing device 105 acquires a first location and a second location that are closest to at least one image frame on time stamps, wherein the first time stamp of the first location is before the time stamp of the at least one image frame, and the second time stamp of the second location is after the time stamp of the at least one image frame. In one embodiment, as described above, the computing device 105 cannot directly determine the location at 1.3 s corresponding to the image frame acquired at 1.3 s, so the computing device may acquire a time stamp of a previous location and a time stamp of a subsequent location that are closest to 1.3 s, for example, the first time stamp of the first location is 1.0 s, and the second time stamp of the second location is 2.0 s. The closest here means that there is no other location data between 1.0 s and 1.3 s and between 1.3 s and 2.0 s.

In block 420, the computing device 105 determines a location change rate based on the first location, the second location, the first time stamp, and the second time stamp. The computing device 105 may determine the location change rate based on the first time stamp 1.0 s and the corresponding first location, the second time stamp 2.0 s and the corresponding second location, for example, the computing device may compute the location change rate every 0.1 s between the first time stamp 1.0 s and the second time stamp 2.0.

In block 430, the computing device 105 determines the target location 170 based on the first location, the first time stamp, the time stamp of the at least one image frame, and the location change rate. In one embodiment, the computing device may determine a location change within 0.3 s based on the location change rate every 0.1 s and the difference 0.3 s between the first time stamp 1.0 s and the time stamp 1.3 s of the at least one image frame, and determine the target location corresponding to the at least one image frame 150 at 1.3 s based on the location change and the location at 1.0 s.

It should be noted that the above method of determining the target location is only illustrative, and the target location may also be determined by other interpolation methods, such as an inverse distance weighting method, a spline interpolation method, a Kriging method, discrete smooth interpolation and trend surface smooth interpolation.

In an alternative embodiment, the computing device 105 may directly determine the location closest to the at least one image frame 150 on the time stamp as the target location 170 within the allowable error range, which provides a good compromise between accuracy and saving of computing resources.

Next, returning to FIG. 2 for description, in block 240, the computing device 105 determines, based on the determined target location and the map 180 related to the physical environment, road information data corresponding to the at least one image frame 150. For example, the computing device 105 may acquire various parameters of the target location 170, such as longitude, latitude, pitch angle, heading angle, and rotation angle, and then find corresponding data from the map 180 based on the parameters. As described above, the map includes accurate road information data corresponding to the at least one image frame 150, such as lane line data 190-3, roadside data 190-2, road arrow 190-4, and bounding box of road sign 190-1. These accurate road information data is compared with the perception data predicted by the neural network with the at least one image frame 150 as input to continuously train the neural network model. The road information data includes, but is not limited to, lane line data, roadside data, guardrail data, street lamp data, or road sign data.

In some embodiments, the road information data is, for example, lane line information or road arrow or sign information at 120 meters ahead of the location of the vehicle in the map 180.

In some embodiments, because the sensor of the vehicle is sometimes placed near the front axle of the vehicle, the vehicle bumps (also known as nodding) during driving due to road conditions and other reasons, resulting in inaccurate acquisition of image frames. In this case, the computing device 105 may acquire an attitude orientation of the target location 170, such as a pitch angle, which indicates the deviation of the vehicle from the road. In response to the pitch angle within a predetermined range, the computing device determines the road information data based on the map 180 and the target location 170. By determining the pitch angle of the vehicle, the road information data acquired is more accurate, thereby providing high-quality truth data for training the network model.

In some embodiments, the sensor 140 may be a camera. The camera has internal and external parameters. The computing device 105 may determine a projection transformation equation through the internal and external parameters of the camera 140, thereby transforming the road information data in the global coordinate system into road information data in the image frame coordinate system.

By establishing the relationship between the locations of the vehicle and the images taken by the vehicle in the present disclosure, the relationship between the road information data in the high-precision map and the images may be further established, and the road information data may be used as annotation data to train a neural network model. Therefore, road information data annotations may be accurately, quickly and efficiently generated at low cost, which lays the foundation for accurate training of the neural network model.

Figure 5:
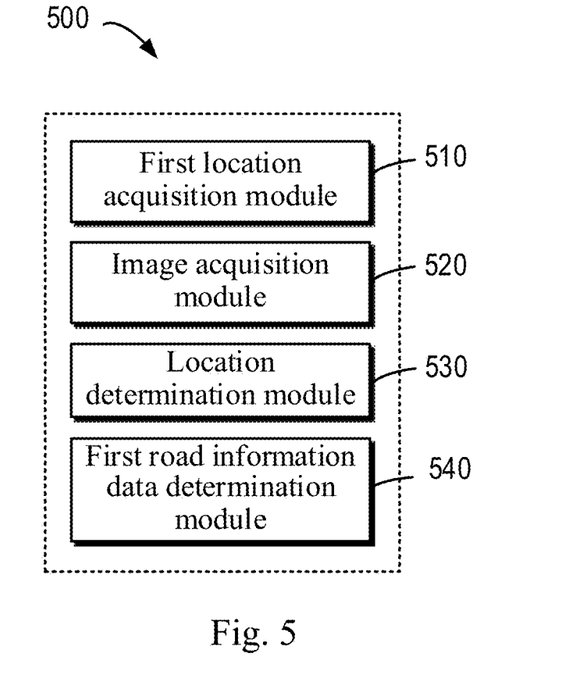
FIG. 5 shows a schematic block diagram of an apparatus for determining road information data according to some embodiments of the present disclosure.

FIG. 5 shows a schematic block diagram of an apparatus for determining road information data according to some embodiments of the present disclosure. The apparatus 500 may be included in the computing device 105 of FIG. 1 or implemented as the computing device 105.

As shown in FIG. 5, the apparatus 500 includes a first location acquisition module 510, configured to determine, via a precision navigation device of a vehicle, a plurality of locations of the vehicle; an image acquisition module 520, configured to acquire, via a sensor of the vehicle, a plurality of image frames of a physical environment where the vehicle is located; a location determination module 530, configured to determine, from the plurality of locations, a target location corresponding to at least one image frame among the plurality of image frames; and a first road information data determination module 540, configured to determine, based on the determined target location and a map related to the physical environment, road information data corresponding to the at least one image frame.

In some embodiments, the location determination module 530 may include: a time stamp offset determination module, configured to acquire a time stamp offset between the system time of the precision navigation device and the time at which the sensor acquires the image frames; a time stamp alignment module, configured to align, based on the time stamp offset, time stamps of the plurality of image frames with time stamps of the plurality of locations; and a first target location determination module, configured to determine the target location based on the plurality of image frames and the plurality of locations that are aligned.

In some embodiments, the first target location determination module may include: a second location acquisition module, configured to acquire a first location and a second location that are closest to the at least one image frame on time stamps, wherein the first time stamp of the first location is before the time stamp of the at least one image frame, and the second time stamp of the second location is after the time stamp of the at least one image frame; a location change rate determination module, configured to determine a location change rate based on the first location, the second location, the first time stamp, and the second time stamp; and a second target location determination module, configured to determine the target location based on the first location, the first time stamp, the time stamp of the at least one image frame, and the location change rate.

In some embodiments, the first road information data determination module 540 may include: an attitude orientation acquisition module, configured to acquire an attitude orientation of the target location; and a second road information data determination module, configured to determine the road information data based on the map and the target location in response to the attitude orientation within a predetermined range.

In some embodiments, the sensor is a camera, and the apparatus 500 may further include: a coordinate system transformation module, configured to transform, based on parameters of the camera, the road information data into road information data in an image frame coordinate system.

In some embodiments, the road information data includes at least one of the following: lane line data, roadside data, guardrail data, street lamp data, or road sign data.

In some embodiments, the precision navigation device is a SPAN-CPT navigation device.

In some embodiments, the map is a high-precision map.

Figure 6:
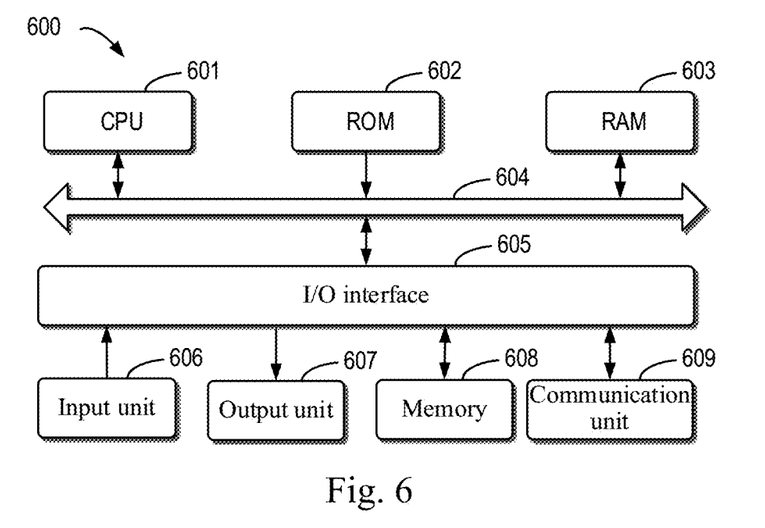
FIG. 6 shows a block diagram of a computing device capable of implementing multiple embodiments of the present disclosure.

FIG. 6 shows a schematic block diagram of an exemplary device 600 that may be used to implement the embodiments of the present disclosure. For example, the computing device 105 in the exemplary environment 100 shown in FIG. 1 may be implemented by the device 600. As shown in FIG. 6, the device 600 includes a central processing unit (CPU) 601, which may execute various appropriate operations and processing based on computer program instructions stored in a read-only memory (ROM) 602 or computer program instructions loaded from a memory 608 to a random access memory (RAM) 603. The RAM 603 may also store various programs and data required by the operations of the device 600. The CPU 601, the ROM 602, and the RAM 603 are connected to each other through a bus 604. An input/output (I/O) interface 605 is also connected to the bus 604.

A plurality of components in the device 600 are connected to the I/O interface 605, including: an input unit 606, such as a keyboard and a mouse; an output unit 607, such as various types of displays and speakers; a memory 608, such as a magnetic disk and an optical disk; and a communication unit 609, such as a network card, a modem, and a wireless communication transceiver. The communication unit 609 allows the device 600 to exchange information/data with other devices over a computer network such as the Internet and/or various telecommunication networks.

The various processes and processing described above, such as the methods 200, 300, and 400, may be executed by the processing unit 601. For example, in some embodiments, the methods 200, 300, and 400 may be implemented as computer software programs, which are tangibly contained in a machine-readable medium, such as the memory 608. In some embodiments, some or all of the computer programs may be loaded and/or installed to the device 600 via the ROM 602 and/or the communication unit 609. When the computer programs are loaded to the RAM 603 and executed by the CPU 601, one or more operations in the methods 200, 300, and 400 described above may be executed.

The present disclosure may be a method, apparatus, system and/or computer program product. The computer program product may include a computer-readable storage medium loaded with computer-readable program instructions for executing various aspects of the present disclosure.

The computer-readable storage medium may be a tangible device that may hold and store instructions used by an instruction execution device. The computer-readable storage medium may be, for example, but is not limited to, an electrical storage device, a magnetic storage device, an optical storage device, an electromagnetic storage device, a semiconductor storage device, or any suitable combination of the above. More specific examples (non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, a punched card storing instructions thereon or a raised structure in a groove, and any suitable combination of the above. The computer-readable storage medium used here is not interpreted as transient signals themselves, such as radio waves or other freely propagated electromagnetic waves, electromagnetic waves propagated through waveguides or other transmission media (for example, light pulses passing through optical fiber cables), or electrical signals transmitted by wires.

The computer-readable program instructions described herein may be downloaded from the computer-readable storage medium to various computing/processing devices, or downloaded to an external computer or external storage device via a network, such as the Internet, a local area network, a wide area network, and/or a wireless network. The network may include copper transmission cables, optical fiber transmission, wireless transmission, a router, a firewall, a switch, a gateway computer, and/or an edge server. A network adapter card or network interface in each computing/processing device receives the computer-readable program instructions from the network, and forwards the computer-readable program instructions for storage in the computer-readable storage medium of each computing/processing device.

The computer program instructions used to perform the operations of the present disclosure may be assembly instructions, instruction set architecture (ISA) instructions, machine instructions, machine-related instructions, microcodes, firmware instructions, status setting data, or source codes or object codes written in one programming language or any combination of more programming languages. The programming languages include object-oriented programming languages such as Smalltalk and C++, and conventional procedural programming languages such as "C" language or similar programming languages. The computer-readable program instructions may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to the user's computer through any network, including a local area network (LAN) or a wide area network (WAN), or may be connected to an external computer (for example, connected through the Internet by an Internet service provider). In some embodiments, an electronic circuit, such as a programmable logic circuit, a field programmable gate array (FPGA), or a programmable logic array (PLA), is customized by means of the status information of the computer-readable program instructions. The electronic circuit may execute the computer-readable program instructions to implement various aspects of the present disclosure.

Herein, the various aspects of the present disclosure are described with reference to the flowcharts and/or block diagrams of the method, apparatus (system) and computer program products according to the embodiments of the present disclosure. It should be understood that each block of the flowcharts and/or block diagrams and the combination of the blocks in the flowcharts and/or block diagrams may be implemented by the computer-readable program instructions.

These computer-readable program instructions may be provided to the processing unit of a general-purpose computer, a special-purpose computer or other programmable data processing apparatus to produce a machine, so that these instructions, when executed by the processing unit of the computer or other programmable data processing apparatus, generate an apparatus for implementing the functions/operations specified in one or more blocks of the flowcharts and/or block diagrams. These computer-readable program instructions may also be stored in a computer-readable storage medium. These instructions cause the computer, programmable data processing apparatus, and/or other devices to work in a specific manner, so that the computer-readable medium storing instructions includes a manufacture, which includes the instructions for implementing various aspects of the functions/operations specified in one or more blocks of the flowcharts and/or block diagrams.

The computer-readable program instructions may also be loaded to a computer, other programmable data processing apparatus, or other devices, so that a series of operation steps are executed on the computer, other programmable data processing apparatus, or other devices to produce a computer-implemented process, so that the instructions executed on the computer, other programmable data processing apparatus, or other devices implement the functions/operations specified in one or more blocks of the flowcharts and/or block diagrams.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or an instruction portion, said module, program segment, or instruction portion including one or more executable instructions for implementing specified logic functions. In some alternative implementations, the functions denoted by the blocks may occur in a sequence different from the sequences shown in the accompanying drawings. For example, two consecutive blocks actually may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The various embodiments of the present disclosure are described above, and the above descriptions are exemplary, not exhaustive, and are not limited to the disclosed embodiments. Many modifications and alterations are apparent to those of ordinary skills in the art without departing from the scope and spirit of the embodiments described. The choices of terms used herein are intended to best explain the principles of the embodiments, practical applications, or improvements on technologies in the market, or to enable other ordinary skilled in the art to understand the various embodiments disclosed herein.

What is claimed is:

1. A method for determining road information data, comprising:
    determining, via a precision navigation device of a vehicle, a plurality of locations of the vehicle;
    acquiring, via a sensor of the vehicle, a plurality of image frames of a physical environment where the vehicle is located;
    determining, from the plurality of locations, a target location corresponding to at least one image frame among the acquired image frames; and determining, based on the determined target location and a map related to the physical environment, road information data corresponding to the at least one image frame by: acquiring a pitch angle of the target location, the pitch angle indicating a deviation of the vehicle from a road; determining that the acquired pitch angle is within a predetermined range; and determining, in response to the acquired pitch angle being within the predetermined range, the road information data based on the map and the target location; and training a neural network model by using the determined road information data as truth data, wherein the trained neural network model is used to predict road information data.

2. The method according to claim 1, wherein the determining a target location corresponding to at least one image frame comprises:

acquiring a time stamp offset between a system time of the precision navigation device and a time at which the sensor acquires the image frames;

aligning, based on the time stamp offset, time stamps of the plurality of image frames with time stamps of the plurality of locations; and determining the target location based on the aligned image frames and the aligned locations.

3. The method according to claim 2, wherein the determining the target location based on the aligned image frames and the aligned locations comprises:

acquiring a first location and a second location that are closest to the at least one image frame on time stamps, wherein a first time stamp of the first location is before the time stamp of the at least one image frame, and a second time stamp of the second location is after the time stamp of the at least one image frame;

determining a location change rate based on the first location, the second location, the first time stamp, and the second time stamp; and determining the target location based on the first location, the first time stamp, the time stamp of the at least one image frame, and the location change rate.

4. The method according to claim 1, wherein the sensor is a camera, and the method further comprises:

transforming, based on parameters of the camera, the road information data into road information data in an image frame coordinate system.

5. The method according to claim 1, wherein the road information data comprises at least one of the following: lane line data, roadside data, guardrail data, street lamp data, or road sign data.

6. The method according to claim 1, wherein the precision navigation device is a SPAN-CPT navigation device.

7. The method according to claim 1, wherein the map is a high-precision map.

8. An electronic device, comprising:
one or more processors; and
a memory for storing one or more programs, wherein the one or more programs, when executed by the one or more processors, cause the one or more processors to perform an operation for searching a video segment, comprising:

determining, via a precision navigation device of a vehicle, a plurality of locations of the vehicle;

acquiring, via a sensor of the vehicle, a plurality of image frames of a physical environment where the vehicle is located;

determining, from the plurality of locations, a target location corresponding to at least one image frame among the acquired image frames; and determining, based on the determined target location and a map related to the physical environment, road information data corresponding to the at least one image frame by: acquiring a pitch angle of the target location, the pitch angle indicating a deviation of the vehicle from a road; determining that the acquired pitch angle is within a predetermined range; and determining, in response to the acquired pitch angle being within the predetermined range, the road information data based on the map and the target location; and training a neural network model by using the determined road information data as truth data, wherein the trained neural network model is used to predict road information data.

9. The device according to claim 8, wherein the determining a target location corresponding to at least one image frame comprises:

acquiring a time stamp offset between a system time of the precision navigation device and a time at which the sensor acquires the image frames;

aligning, based on the time stamp offset, time stamps of the plurality of image frames with time stamps of the plurality of locations; and determining the target location based on the aligned image frames and the aligned locations.

10. The device according to claim 9, wherein the determining the target location based on the aligned image frames and the aligned locations comprises:

acquiring a first location and a second location that are closest to the at least one image frame on time stamps, wherein a first time stamp of the first location is before the time stamp of the at least one image frame, and a second time stamp of the second location is after the time stamp of the at least one image frame;

determining a location change rate based on the first location, the second location, the first time stamp, and the second time stamp; and determining the target location based on the first location, the first time stamp, the time stamp of the at least one image frame, and the location change rate.

11. The device according to claim 8, wherein the sensor is a camera, and the method further comprises:

transforming, based on parameters of the camera, the road information data into road information data in an image frame coordinate system.

12. The device according to claim 8, wherein the road information data comprises at least one of the following: lane line data, roadside data, guardrail data, street lamp data, or road sign data.

13. The device according to claim 8, wherein the precision navigation device is a SPAN-CPT navigation device.

14. The device according to claim 8, wherein the map is a high-precision map.

15. A computer-readable storage medium, storing a computer program thereon, wherein when the program is executed by a processor, causes the processor to perform an operation for identifying a video, comprising:

determining, via a precision navigation device of a vehicle, a plurality of locations of the vehicle;

acquiring, via a sensor of the vehicle, a plurality of image frames of a physical environment where the vehicle is located;

determining, from the plurality of locations, a target location corresponding to at least one image frame among the acquired image frames; and determining, based on the determined target location and a map related to the physical environment, road information data corresponding to the at least one image frame by: acquiring a pitch angle of the target location, the pitch angle indicating a deviation of the vehicle from a road; determining that the acquired pitch angle is within a predetermined range; and determining, in response to the acquired pitch angle being within the predetermined range, the road information data based on the map and the target location; and training a neural network model by using the determined road information data as truth data, wherein the trained neural network model is used to predict road information data.

16. The medium according to claim 15, wherein the determining a target location corresponding to at least one image frame comprises:

acquiring a time stamp offset between a system time of the precision navigation device and a time at which the sensor acquires the image frames;

aligning, based on the time stamp offset, time stamps of the plurality of image frames with time stamps of the plurality of locations; and determining the target location based on the aligned image frames and the aligned locations.

17. The medium according to claim 16, wherein the determining the target location based on the aligned image frames and the aligned locations comprises:

acquiring a first location and a second location that are closest to the at least one image frame on time stamps, wherein a first time stamp of the first location is before the time stamp of the at least one image frame, and a second time stamp of the second location is after the time stamp of the at least one image frame;

determining a location change rate based on the first location, the second location, the first time stamp, and the second time stamp; and determining the target location based on the first location, the first time stamp, the time stamp of the at least one image frame, and the location change rate.

* * * * *